US010615795B2

(12) United States Patent
Wang et al.

(10) Patent No.: US 10,615,795 B2
(45) Date of Patent: Apr. 7, 2020

(54) PHYSICAL UNCLONABLE FUNCTION (PUF) DEVICE

(71) Applicant: SHENZHEN WEITONGBO TECHNOLOGY CO., LTD., Shenzhen (CN)

(72) Inventors: Wenxuan Wang, Shenzhen (CN); Jian Shen, Shenzhen (CN); Yunning Li, Shenzhen (CN)

(73) Assignee: SHENZHEN WEITONGBO TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 16/664,912

(22) Filed: Oct. 27, 2019

(65) Prior Publication Data

US 2020/0059234 A1 Feb. 20, 2020

Related U.S. Application Data

(63) Continuation of application No. PCT/CN2018/100023, filed on Aug. 10, 2018.

(51) Int. Cl.
*H03K 19/003* (2006.01)
*H03K 3/84* (2006.01)
(Continued)

(52) U.S. Cl.
CPC ....... *H03K 19/00315* (2013.01); *G06F 21/72* (2013.01); *H03K 3/84* (2013.01); *H04L 9/3278* (2013.01)

(58) Field of Classification Search
None
See application file for complete search history.

(56) References Cited

U.S. PATENT DOCUMENTS 9,613,714 B1 * 4/2017 Wong ................. G11C 16/26
9,966,954 B1   5/2018 Yang et al.
(Continued)

FOREIGN PATENT DOCUMENTS

CN   102880840 A   1/2013
CN   105676942 A   6/2016
(Continued)

OTHER PUBLICATIONS

T. Bauer and J. Hamlet, "Physical Unclonable Functions: A Primer," in IEEE Security & Privacy, vol. 12, No. 6, pp. 97-101, Nov.-Dec. 2014. doi: 10.1109/MSP.2014.123.

*Primary Examiner* — Minh D A
*Assistant Examiner* — James H Cho

(57) ABSTRACT

A PUF device and a method of outputting a random sequence are disclosed. The PUF device includes: at least one processing unit and at least one PUF unit, and a first PUF unit of the at least one PUF unit includes a first MOS transistor and a second MOS transistor, two sources of the two MOS transistors are connected to a same input voltage; two gates of the two MOS transistors are floating; and two drains of the two MOS transistors are respectively connected with a first processing unit, and the first processing unit is configured to: output a first random value corresponding to the first PUF unit according to a difference between two results output by the two drains of the two MOS transistors, when the input voltage is greater than or equal to a preset voltage.

20 Claims, 4 Drawing Sheets

(51) Int. Cl.
*H04L 9/32* (2006.01)
*G06F 21/72* (2013.01)

(56) References Cited

U.S. PATENT DOCUMENTS

| 10,177,924 B1* | 1/2019 | Chen | G11C 17/18 |
| 2011/0317829 A1 | 12/2011 | Ficke et al. | |
| 2017/0200508 A1* | 7/2017 | Grigoriev | G11C 7/24 |
| 2019/0253266 A1* | 8/2019 | Lee | G06F 21/71 |
| 2019/0333567 A1* | 10/2019 | Giterman | G11C 11/408 |

FOREIGN PATENT DOCUMENTS

| CN | 106981300 A | 7/2017 |
| CN | 107766750 A | 3/2018 |

* cited by examiner

500

| inputting a same input voltage to a first source of a first MOS transistor and a second source of a second transistor simultaneously, where a first gate of the first MOS transistor and a second gate of the second MOS transistor are floating | S510 |

| acquiring a first result output by a first drain of the first MOS transistor and a second result output by a second drain of the second MOS transistor when an absolute value of the input voltage is greater than or equal to a preset voltage | S520 |

| outputting a first random value corresponding to a first PUF unit according to a difference between the first result and the second result | S530 |

FIG. 6

PHYSICAL UNCLONABLE FUNCTION (PUF) DEVICE

CROSS REFERENCE TO RELATED APPLICATIONS

The present application is a continuation of international application No. PCT/CN2018/100023, filed on Aug. 10, 2018, which is hereby incorporated by reference in its entirety.

TECHNICAL FIELD

The present application relates to the field of information security, and in particular to physical unclonable function PUF device.

BACKGROUND

Physical unclonable function (PUF) technology is a technology of obtaining unique random codes by using uncontrollable random variations in a process of manufacturing a semiconductor chip. The manufacturing variations include process variations of a semiconductor. Even if there are precise process steps that can manufacture a semiconductor chip, process variations are almost impossible to be replicated, such as film thickness distribution, micro defect distribution, ion implantation distribution and other random factors. Therefore, a semiconductor chip with the PUF technology is commonly applied to an application for high safety protection.

The current PUF implementation manners mainly include: a non-electronic PUF, such as an optical PUF; an analog circuit PUF, such as a coated capacitor PUF; a digital circuit PUF, such as a static random-access memory (SRAM)-based PUF; and the like. Among them, implementation manners of the non-electronic PUF and the analog circuit PUF are relatively complex, and integrating with a large-scale digital circuit are relatively inconvenient. Therefore, a structure of the digital circuit PUF is a relatively hot research direction of safety application in the field of integrated circuits at present.

The current digital circuit-based PUF implementation manners mainly focus on an SRAM-based PUF implementation, propagation delay-based and one time programmable memory (OTP) structure-based PUF implementations, and the like, where the SRAM-based PUF implementation may generate a certain bit error rate in a process of application, and each SRAM unit circuit is relatively complex and cannot have a very large capacity; however, it is easy to read and obtain challenge/response pairs (CRPs) of the PUF in a fusing state of the OTP due to limitations of the OTP itself, thereby deciphering a security key generated by the PUF from a device itself.

SUMMARY

The present application provides a PUF device and a method of outputting a random sequence. The PUF device has a simple structure, there is no physical damage in a process of implementing functions, and it is not easy to be cracked from a device side.

In a first aspect, a PUF device is provided. The PUF device includes: at least one PUF unit and at least one processing unit, a first PUF unit of the at least one PUF unit includes two metal oxide semiconductor (MOS) transistors, the two MOS transistors include a first MOS transistor and a second MOS transistor, and the first PUF unit is any one of the at least one PUF unit, where a first source of the first MOS transistor and a second source of the second MOS transistor are connected to a same input voltage; a first gate of the first MOS transistor and a second gate of the second MOS transistor are floating; and a first drain of the first MOS transistor and a second drain of the second MOS transistor are connected with a first processing unit of the at least one processing unit, and the first processing unit is configured to: output a first random value corresponding to the first PUF unit according to a difference between a first result output by the first drain and a second result output by the second drain, when an absolute value of the input voltage is greater than or equal to a preset voltage.

Therefore, a PUF device according to an embodiment of the present application includes at least one PUF unit, each PUF unit needs only two MOS transistors, and thus the device has a simple structure and a relatively simple implementation manner, provides a possibility for an implementation of a large capacity PUF, and can be manufactured based on standard MOS processes in a manufacturing process without a need to add additional manufacturing processes. In use, gates of the two MOS transistors are floating, sources of the two MOS transistors are connected to a same input voltage, and the remaining two drains are applied with the same low potential such that the two MOS transistors present different turnon characteristics depending on the capacitance coupling effect, thereby implementing functions of the PUF. In the foregoing process, since no physical damage is caused to the device in a process of generating challenge/response pairs, it is relatively difficult to read the challenge/response pairs (CRPs) from the device itself to decipher a key it generates.

With reference to the first aspect, in an implementation manner of the first aspect, the two MOS transistors are MOS transistors having a same structure with only processing difference.

With reference to the first aspect and the foregoing implementation manner thereof, in another implementation manner of the first aspect, the two MOS transistors share a same source.

With reference to the first aspect and the foregoing implementation manners thereof, in another implementation manner of the first aspect, the at least one processing unit is configured to: output a random sequence corresponding to the at least one PUF unit, where the random sequence includes at least one random value in one-to-one correspondence to the at least one PUF unit.

With reference to the first aspect and the foregoing implementation manners thereof, in another implementation manner of the first aspect, the PUF device further includes at least one gating unit, and a first gating unit of the at least one gating unit that corresponds to the first PUF unit is configured to control a state of the first PUF unit.

With reference to the first aspect and the foregoing implementation manners thereof, in another implementation manner of the first aspect, the PUF device further includes: at least one control unit, and a first control unit of the least one control unit is configured to control connection and disconnection of the corresponding first gating unit, where the first PUF unit is in a gating state when the first gating unit is connected, or the first PUF unit is in a disconnection state when the first gating unit is disconnected.

With reference to the first aspect and the foregoing implementation manners thereof, in another implementation manner of the first aspect, the first gating unit is a third MOS transistor.

With reference to the first aspect and the foregoing implementation manners thereof, in another implementation manner of the first aspect, the at least one PUF unit is a PUF unit array of n*m, the at least one gating unit is a third MOS transistor array of n*m, a third end of each third MOS transistor is electrically connected with two sources of two MOS transistors included in a corresponding PUF unit, first ends of n third MOS transistors in each column are electrically connected, and second ends of m third MOS transistors in each row are electrically connected, where a third MOS transistor in the i-th row and the j-th column is connected when a first end in the j-th column is input with a first voltage and a second end in the i-th row is input with a second voltage, n and m being positive integers, i=1, 2, . . . , n, and j=1, 2, . . . , m.

With reference to the first aspect and the foregoing implementation manners thereof, in another implementation manner of the first aspect, the at least one processing unit is configured to: control third MOS transistors in the third MOS transistor array of n*m to be sequentially connected in a preset order, and output the random sequence, where the random sequence includes n*m random values that are arranged in the preset order and in one-to-one correspondence to n*m PUF units.

With reference to the first aspect and the foregoing implementation manners thereof, in another implementation manner of the first aspect, the first end is a gate of the third MOS transistor, and the second end is a source or a drain of the third MOS transistor; or the first end is a source or a drain of the third MOS transistor, and the second end is a gate of the third MOS transistor.

With reference to the first aspect and the foregoing implementation manners thereof, in another implementation manner of the first aspect, the first processing unit includes a comparator, and the comparator is configured to: compare the difference between the first result and the second result, and output the first random value.

With reference to the first aspect and the foregoing implementation manners thereof, in another implementation manner of the first aspect, the at least one PUF unit is a PUF unit array of n*m, n and m being positive integers, and PUF units in a same row or in a same column are connected to a same comparator.

With reference to the first aspect and the foregoing implementation manners thereof, in another implementation manner of the first aspect, the comparator is configured to: output the first random value as a first numerical value if the first result is greater than the second result; or output the first random value as a second numerical value if the first result is less than the second result.

With reference to the first aspect and the foregoing implementation manners thereof, in another implementation manner of the first aspect, the first processing unit further includes an integrator, and the integrator is configured to: perform integration and amplification processing on the first result and the second result; and the comparator is configured to: compare a difference between a first result and a second result after the integration and amplification processing, and output the first random value.

With reference to the first aspect and the foregoing implementation manners thereof, in another implementation manner of the first aspect, the at least one PUF unit is a PUF unit array of n*m, n and m being positive integers, and each PUF unit in the PUF unit array includes the first MOS transistor and the second MOS; where drains of n first MOS transistors in PUF units in a same column are connected to a first integrator, drains of n second MOS transistors in the PUF units in the same column are connected to a second integrator, and the first integrator and the second integrator are connected to a same comparator; or drains of m first MOS transistors in PUF units in a same row are connected to a first integrator, drains of m second MOS transistors in the PUF units in the same row are connected to a second integrator, and the first integrator and the second integrator are connected to a same comparator.

In a second aspect, a method of outputting a random sequence is provided. The method is applied to a physical unclonable function PUF device, the PUF device includes at least one PUF unit, a first PUF unit of the at least one PUF unit includes two MOS transistors, the two MOS transistors includes a first MOS transistor and a second MOS transistor, the first PUF unit is any one of the at least one PUF unit, and the method includes: inputting a same input voltage to a first source of the first MOS transistor and a second source of the second MOS transistor simultaneously, where a first gate of the first MOS transistor and a second gate of the second MOS transistor are floating; acquiring a first result output by a first drain of the first MOS transistor and a second result output by a second drain of the second MOS transistor when an absolute value of the input voltage is greater than or equal to a preset voltage; and outputting a first random value corresponding to the first PUF unit according to a difference between the first result and the second result.

Therefore, a method of outputting a random sequence by a PUF device according to an embodiment of the present application is applied to the PUF device including at least one PUF unit, each PUF unit needs only two MOS transistors, and thus the device has a simple structure and a relatively simple implementation manner, provides a possibility for an implementation of a large capacity PUF, and can be manufactured based on standard MOS processes in a manufacturing process without a need to add additional manufacturing processes. In use, gates of the two MOS transistors are floating, sources of the two MOS transistors are connected to a same input voltage, and the remaining two drains are applied with the same low potential such that the two MOS transistors present different turnon characteristics depending on the capacitance coupling effect, thereby implementing functions of the PUF. In the foregoing process, since no physical damage is caused to the device in a process of generating challenge/response pairs, it is relatively difficult to read the challenge/response pairs (CRPs) from the device itself to decipher a key it generates.

With reference to the second aspect, in an implementation manner of the second aspect, the two MOS transistors are MOS transistors having a same structure with only processing difference.

With reference to the second aspect and the foregoing implementation manner thereof, in another implementation manner of the second aspect, the two MOS transistors share a same source.

With reference to the second aspect and the foregoing implementation manners thereof, in another implementation manner of the second aspect, the method further includes: outputting a random sequence corresponding to the at least one PUF unit, where the random sequence includes at least one random value in one-to-one correspondence to the at least one PUF unit.

With reference to the second aspect and the foregoing implementation manners thereof, in another implementation manner of the second aspect, the PUF device further includes at least one gating unit, and the method further includes: controlling, by a first gating unit of the at least one gating unit that corresponds to the first PUF unit, a state of the first PUF unit.

With reference to the second aspect and the foregoing implementation manners thereof, in another implementation manner of the second aspect, the method further includes: controlling connection and disconnection of the first gating unit, where the first PUF unit is in a gating state when the first gating unit is connected, or the first PUF unit is in a disconnection state when the first gating unit is disconnected.

With reference to the second aspect and the foregoing implementation manners thereof, in another implementation manner of the second aspect, the first gating unit is a third MOS transistor.

With reference to the second aspect and the foregoing implementation manners thereof, in another implementation manner of the second aspect, the at least one PUF unit is a PUF unit array of n*m, the at least one gating unit is a third MOS transistor array of n*m, a third end of each third MOS transistor is electrically connected with two sources of two MOS transistors included in a corresponding PUF unit, first ends of n third MOS transistors in each column are electrically connected, and second ends of m third MOS transistors in each row are electrically connected, where a third MOS transistor in the i-th row and the j-th column is connected when a first end in the j-th column is input with a first voltage and a second end in the i-th row is input with a second voltage, n and m being positive integers, i=1, 2, . . . , n, and j=1, 2, . . . , m.

With reference to the second aspect and the foregoing implementation manners thereof, in another implementation manner of the second aspect, the first end is a gate of the third MOS transistor, and the second end is a source or a drain of the third MOS transistor; or the first end is a source or a drain of the third MOS transistor, and the second end is a gate of the third MOS transistor.

With reference to the second aspect and the foregoing implementation manners thereof, in another implementation manner of the second aspect, the PUF device includes a comparator, and the outputting the first random value corresponding to the first PUF unit according to the difference between the first result and the second result includes: comparing, by the comparator, the difference between the first result and the second result, and outputting the first random value.

With reference to the second aspect and the foregoing implementation manners thereof, in another implementation manner of the second aspect, the at least one PUF unit is a PUF unit array of n*m, n and m being positive integers, and PUF units in a same row or in a same column are connected to a same comparator.

With reference to the second aspect and the foregoing implementation manners thereof, in another implementation manner of the second aspect, the comparing, by the comparator, the difference between the first result and the second result, and outputting the first random value includes: outputting, by the comparator, the first random value as a first numerical value if the first result is greater than the second result; or outputting, by the comparator, the first random value as a second numerical value if the first result is less than the second result.

With reference to the second aspect and the foregoing implementation manners thereof, in another implementation manner of the second aspect, the PUF device further includes an integrator, and the method further includes: performing, by the integrator, integration and amplification processing on the first result and the second result; and the comparing, by the comparator, the difference between the first result and the second result, and outputting the first random value includes: comparing, by the comparator, a difference between a first result and a second result after the integration and amplification processing, and outputting the first random value.

With reference to the second aspect and the foregoing implementation manners thereof, in another implementation manner of the second aspect, the at least one PUF unit is a PUF unit array of n*m, n and m being positive integers, and each PUF unit in the PUF unit array includes the first MOS transistor and the second MOS; where drains of n first MOS transistors in PUF units in a same column are connected to a first integrator, drains of n second MOS transistors in the PUF units in the same column are connected to a second integrator, and the first integrator and the second integrator are connected to a same comparator; or drains of m first MOS transistors in PUF units in a same row are connected to a first integrator, drains of m second MOS transistors in the PUF units in the same row are connected to a second integrator, and the first integrator and the second integrator are connected to a same comparator.

In a third aspect, a PUF structure is provided. The PUF structure includes: two MOS transistors, and the two MOS transistors include a first MOS transistor and a second MOS transistor, where a first source of the first MOS transistor and a second source of the second MOS transistor are connected to a same input voltage; a first gate of the first MOS transistor and a second gate of the second MOS transistor are floating; and a first drain of the first MOS transistor outputs a first result and a second drain of the second MOS transistor outputs a second result when an absolute value of the input voltage is greater than or equal to a preset voltage, and the first result and the second result are used to determine a random value of the PUF structure.

BRIEF DESCRIPTION OF DRAWINGS

FIG. 6 is a schematic flowchart of a method of outputting a random sequence according to an embodiment of the present application.

DESCRIPTION OF EMBODIMENTS

The technical solutions in embodiments of the present application will be described hereinafter with reference to the accompanying drawings.

An embodiment of the present application provides a PUF device, and the PUF device may include at least one PUF unit and at least one processing unit. For convenience of description, a first PUF unit of the at least one PUF unit is taken as an example here for description, and the first PUF unit is any one of the at least one PUF unit. Correspondingly, a first processing unit of the at least one processing unit that corresponds to the first PUF unit is taken as an example for description, where one of the at least one processing unit may correspond to one or more PUF unit, and the embodiment of the present application is not limited thereto.

Figure 1:
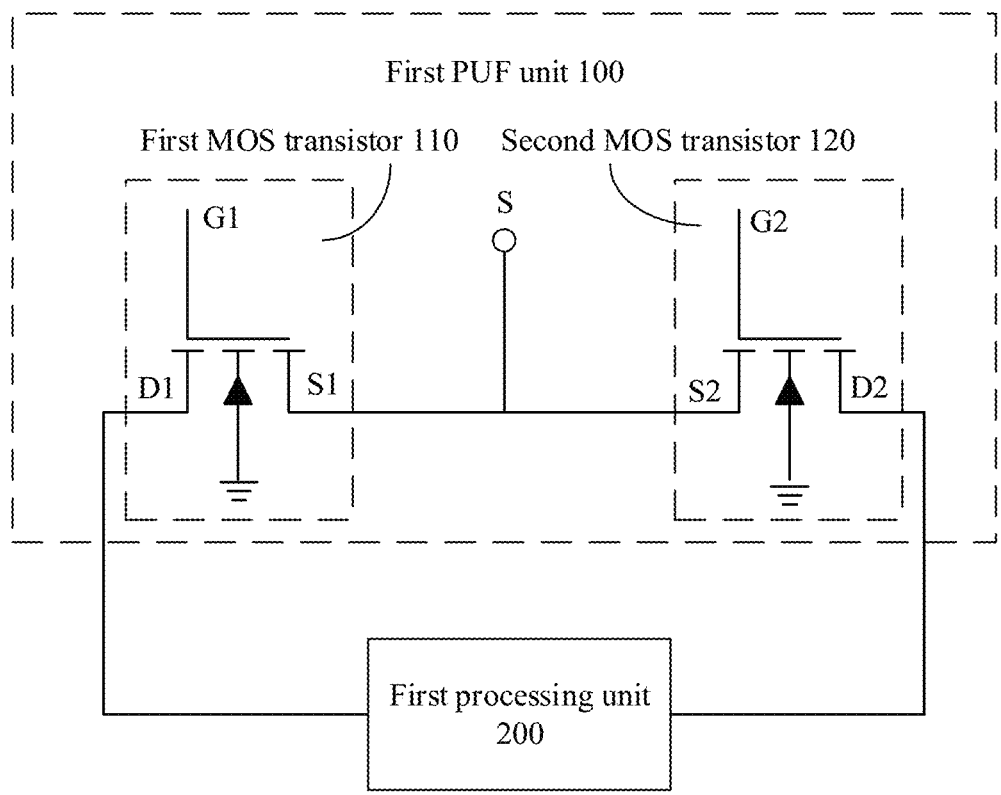
FIG. 1 is a schematic diagram of a first PUF unit and a first processing unit in a PUF device according to an embodiment of the present application.

FIG. 1 shows a schematic diagram of a first PUF unit 100 and a first processing unit 200 in a PUF device according to an embodiment of the present application. As shown in FIG. 1, the first PUF unit 100 includes two MOS transistors, which are a first MOS transistor 110 and a second MOS transistor 120, respectively. Particularly, a first gate G1 of the first MOS transistor 110 and a second gate G2 of the second MOS transistor 120 are floating; a first source S1 of the first MOS transistor 110 and a second source S2 of the second MOS transistor 120 are connected to a same input voltage; and a first drain D1 of the first MOS transistor 110 and a second drain D2 of the second MOS transistor 120 are connected with the first processing unit 200, respectively.

The same input voltage is input to the first source S1 of the first MOS transistor 110 and the second source S2 of the second MOS transistor 120 simultaneously; the first drain D1 of the MOS transistor 110 outputs a first result and the second drain D2 of the second MOS transistor 120 outputs a second result when an absolute value of the input voltage is greater than or equal to a preset voltage; and the first processing unit 200 compares a difference between the first result and the second result, and outputs a first random value corresponding to the first PUF unit 100.

It should be understood that each of the at least one PUF unit included in the PUF device may output a random value, and a random sequence corresponding to the PUF device may be output by the at least one processing unit, where the random sequence includes at least one random value in one-to-one correspondence to the at least one PUF unit.

In the embodiment of the present application, the two MOS transistors in the first PUF unit are MOS transistors having exactly a same structure, and the two MOS transistors are different only in processing technique. Particularly, in the first PUF unit of the PUF device, the sources of the two MOS transistors are input with the same input voltage. For example, for two N-type MOS transistors, a same positive voltage may be input to their sources thereof; and for another example, for two P-type MOS transistors, a same negative voltage may be input to their sources thereof. In addition, the gates of the two MOS transistors are floating, the respective drains of the two MOS transistors are connected to low potential or to zero potential, and a substrate of the two MOS transistors is grounded (zero potential). Since the gates of the two MOS transistors are floating, when the absolute value of the same input voltage input to the sources is greater than or equal to a value of the preset voltage, due to the capacitance coupling effect, the first MOS transistor 110 and the second MOS transistor 120 may randomly and successively reach a threshold voltage and be turned on, that is, different output results may be obtain at the respective drains of the two MOS transistors.

By using uncontrollable random variations of the two MOS transistors in process, such as uniformity of thickness of gate oxide layers or other defects of the two MOS transistors, a polysilicon gate grain boundary and doping resulting in different work functions, a difference in channel doping distribution of the two MOS transistors and other factors, turnon characteristics of the two MOS transistors have an unpredictable difference. Due to this difference, when the sources of the two MOS transistors are input with the same energy simultaneously, for example, when the absolute value of the input voltage input simultaneously is greater than or equal to the preset voltage, energy output by the two MOS transistors is obviously different, and this difference is determined and exists stably after manufacturing an integrated circuit, and cannot be predicted in advance. Even if products are manufactured by using a same process, a difference of each product is different and unpredictable. Therefore, the PUF unit including the two MOS transistors has obvious features of PUF, that is, the PUF device having at least one PUF unit also has the obvious features of the PUF. Moreover, the PUF device has a simple structure, and a function implementation structure of each PUF unit includes only two MOS; and there is no physical damage to the device in a process of work, it is difficult to decipher from a device side, and security is relatively high. Therefore, the embodiment of the present application can be widely applied to various fields that need to generate unique and non-replicable ID scenarios and high safety protection, such as radio frequency identification (RFID), identity authorization of Internet of Things devices and generation of electronic keys.

It should be understood that connecting the first source S1 of the first MOS transistor 110 and the second source S2 of the second MOS transistor 120 to the same input voltage may include: sharing a same source S to the first source S1 of the first MOS transistor 110 and the second source S2 of the second MOS transistor 120, and inputting the input voltage to the shared source S. Particularly, the two MOS transistors in the first PUF unit share the source, and there is a doped region below the shared source that extends to the bottom of the gates of the two MOS and has a same doping type as the shared source.

Figure 2:
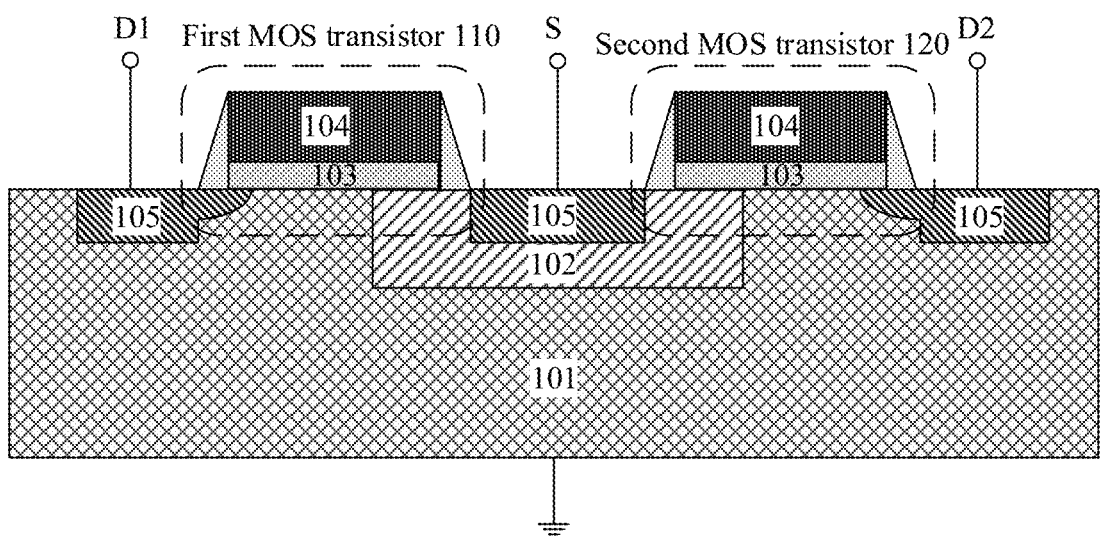
FIG. 2 is a sectional view of two MOS transistors according to an embodiment of the present application.
Figure 3:
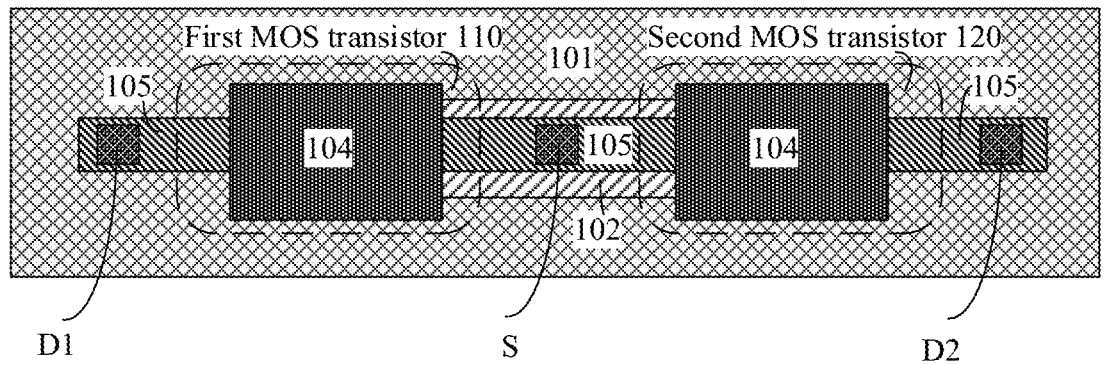
FIG. 3 is a top view of the two MOS transistors shown in FIG. 2.

The first PUF unit of the at least one PUF unit is still taken as an example, and that the first MOS transistor 110 and the second MOS transistor 120 in the first PUF unit share the same source is taken as an example below for description. Particularly, FIG. 2 shows a sectional view of two MOS transistors according to an embodiment of the present application, and FIG. 3 shows a top view of the two MOS transistors shown in FIG. 2, where the two MOS transistors are a same type of MOS transistors, that is, the MOS transistors are not limited to N-type or a P-type MOS transistors as long as the two MOS transistors are the same type of MOS transistors. That the two MOS transistors are N-type MOS transistors is taken as an example here for description.

Particularly, as shown in FIGS. 2 and 3, structures shown in FIGS. 2 and 3 may be produced by standard IC processes. 101 is a P-type substrate; and since the N-type MOS transistors are used here, a substrate thereof is the P-type substrate, and the substrate 101 is grounded. 103 are gate oxide layers of the two MOS transistors. 104 are polysilicon gates, and the gates are floating when the two MOS transistors are in operation. In addition, for FIGS. 2 and 3, there are triangular structures located on two sides of each gate oxide layer 103 and polysilicon gate 104 in the drawings. For example, the gate oxide layer 103 and the polysilicon gate 104 on the left part have such a triangular structure on each side. The triangular structures are spacer structures (spacers) of the MOS transistors that can be used to prevent the hot carrier effect and the like, and the embodiment of the present application is not limited thereto.

105 is an N-type doped region doped N-type doped elements such as phosphorus and used as doping for a source and a drain, respectively. The doped regions 105 of the left and right parts shown in FIGS. 2 and 3 are two drains of a first MOS transistor and a second MOS transistor, respectively. The doped regions 105 and 102 in the middle of FIGS. 2 and 3 are a shared source of the two MOS transistors, where 102 is a doped region below the shared source that extends to the bottom of the two gates and adopts a same doping type as 105, that is, N-type doping and a doping concentration lower than a doping concentration of 105 are used in the present embodiment. The doping distribution condition of the region 102 may be controlled by controlling parameters such as an ion doping concentration, doping energy and a doping angle, and its feature is that the doping region extends to the bottom of the gates of the two MOS transistors so as to ensure an implementation of the capacitance coupling effect.

It should be understood that the distribution range of the region 102 is not rigidly specified in the embodiment of the present application, as long as it extends to the lower region of the gate of the MOS transistor. For example, areas of the lower regions of the gates of the two MOS transistors that 102 extends to are not limited. Due to characteristics of a process, the structures of such two MOS transistors can ensure high symmetry of the PUF unit without a need to additionally precisely control an alignment process of each layer.

A manufacturing method of a PUF unit composed of such two MOS transistors in the embodiment of the present application may be based on standard integrated circuit processes, where in addition to the foregoing necessary processes, other specific processes may be based on the existing standard processes, and will not be repeated redundantly herein.

It should be understood that when the first PUF unit shown in FIGS. 2 and 3 is in operation, a positive voltage is applied to a shared source end S, the same low level is applied (zero level may be applied simultaneously) to drain ends D1 and D2 of the two MOS transistors, respectively, and due to the capacitance coupling effect, the gate of the first MOS transistor 110 on the left and the gate of the second MOS transistor 120 on the right sense high levels, respectively. However, due to differences and fluctuation of manufacturing processes, although the two MOS transistors are manufactured by the same processes and have a same structure and size and a same design in threshold voltage, the sensed levels have a certain difference, which causes a certain difference between turnon states of the first MOS transistor 110 and the second MOS transistor 120, thereby resulting in a difference between total quantities of current or charges flowing through the two transistors. However, this difference cannot be predicted in advance, so this structure has features of PUF.

It should be understood that the first processing unit 200 in the embodiment of the present application may further include a comparator, and the comparator may be configured to compare the difference between the first result output by the first drain D1 of the first MOS transistor 110 and the second result output by the second drain D2 of the second MOS transistor 120, thereby outputting the first random value corresponding to the first PUF unit.

Optionally, the first processing unit 200 in the embodiment of the present application may further include an integrator, the integrator may be configured to perform integration and amplification processing on the first result output by the first drain D1 of the first MOS transistor 110 and the second result output by the second drain D2 of the second MOS transistor 120, and the comparator in the first processing unit 200 compares a difference between a first result and a second result after the amplification processing, and outputs the first random value.

In the embodiment of the present application, the first result and the second result have a same parameter. For example, the first result and the second result may each include at least one of the following parameters: voltage, current, and a quantity of charges, but the embodiment of the present application is not limited thereto.

Figure 4:
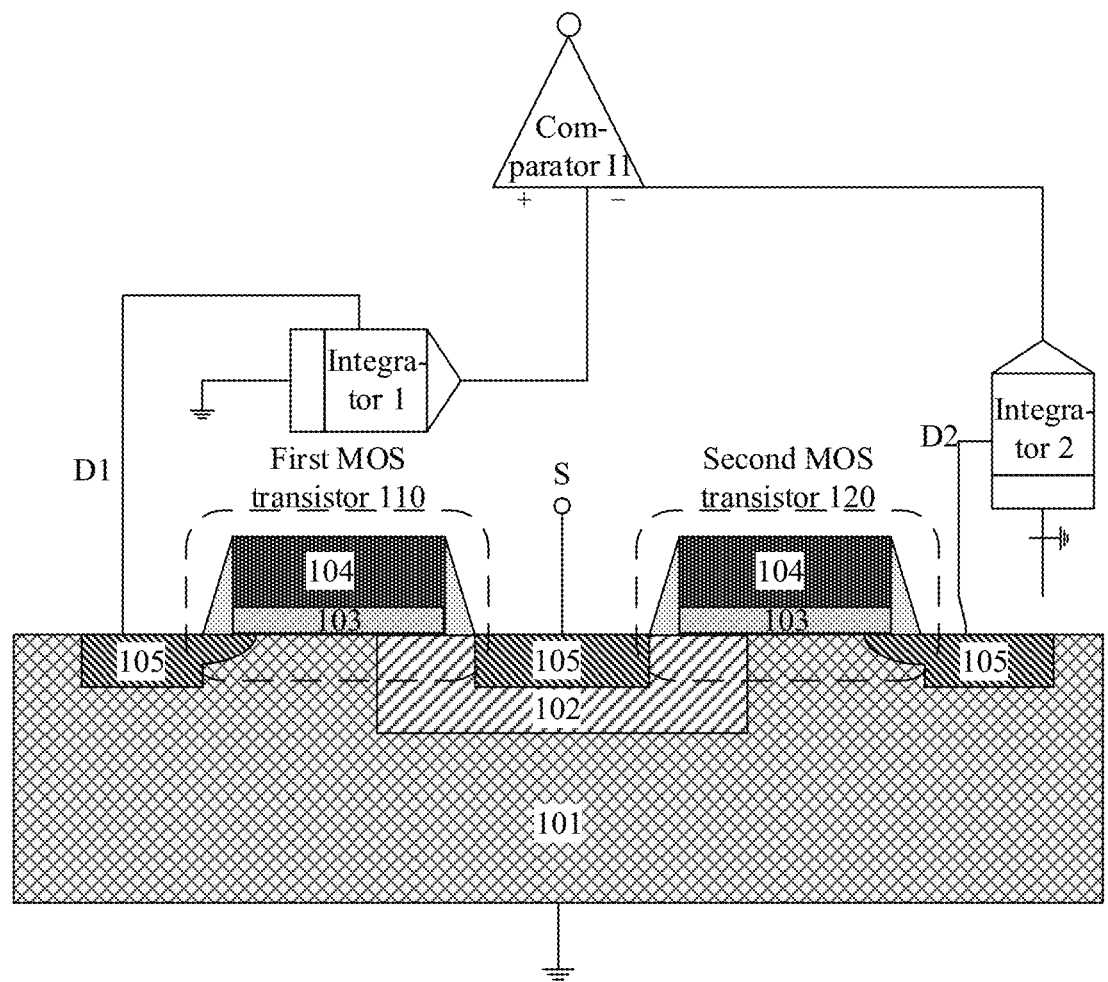
FIG. 4 is a schematic diagram of an operation of a first PUF unit in a PUF device according to an embodiment of the present application.

Particularly, FIG. 4 shows a schematic diagram of an operation of a PUF device according to an embodiment of the present application. As shown in FIG. 4, the first PUF unit shown in FIGS. 2 and 3 is taken as an example here, and a corresponding first processing unit 200 includes a comparator and integrators. Particularly, a pulse voltage or current signal is applied to the shared source S of the two MOS transistors, and the first drain D1 and the second drain D2 are respectively connected to an integrator 1 and an integrator 2 that have a same structure. In a certain voltage or current period, for example, the voltage is greater than or equal to a preset voltage or the voltage is greater than or equal to a preset current, the two integrators perform integration and amplification on different quantities of charges flowing through the first MOS transistor 110 and the second MOS transistor 120 such that output voltages of the integrators 1 and 2 have a larger cumulative difference. Then, output ends of the two integrators are connected to a same comparator I1 and the two output voltages are compared. That is, the first result output by the first drain D1 of the first MOS transistor 110 and the second result output by the second drain D2 of the second MOS transistor 120 are input to the comparator, and the first result and the second result are voltage values. Then, the first random value of the first PUF unit is output according to a comparison result, thereby completing a process of randomly generating a bit of data by a PUF unit.

The first random value may be 0 or 1. For example, when the voltage value of the first result output by the first MOS transistor 110 is greater than the second result of the second MOS transistor 120, 1 is output; or when the voltage value of the first result output by the first MOS transistor 110 is less than the second result of the second MOS transistor 120, 0 is output.

Any one of PUF units in a PUF device is taken as an example for description above. The PUF device may include at least one PUF unit as shown above, the PUF device may further include at least one processing unit, and each PUF unit outputs a random value through a corresponding processing unit. Optionally, the PUF device may further include at least one gating unit, the at least one gating unit may be in one-to-one correspondence to the at least one PUF unit, and each gating unit is configured to control a state of a corresponding PUF unit.

Particularly, a first gating unit corresponding to the first PUF unit is taken as an example, and the first gating unit is configured to control a state of the first PUF. The first PUF unit is in a gating state when the first gating unit is connected, and the first PUF unit outputs a corresponding first random value; or the first PUF unit is in a disconnection state when the first gating unit is disconnected, and a corresponding first random value is not output.

Therefore, the PUF device controls the at least one PUF unit to be sequentially in a gating state in a preset order through the at least one gating unit. For example, the PUF device may further include at least one control unit, and the at least one gating unit is controlled to be sequentially connected in the preset order by the at least one control unit, that is, a corresponding PUF unit is sequentially in a gating state. A random sequence of the PUF device is correspondingly output, and random values in the random sequence are arranged in the preset order and in one-to-one correspondence to PUF units.

It should be understood that the gating unit included in the PUF device may be implemented in various forms, for example, the gating unit may be either a switch or a MOS transistor. For example, the first gating unit corresponding to the first PUF unit may be a third MOS transistor, but the embodiment of the present application is not limited thereto.

Figure 5:
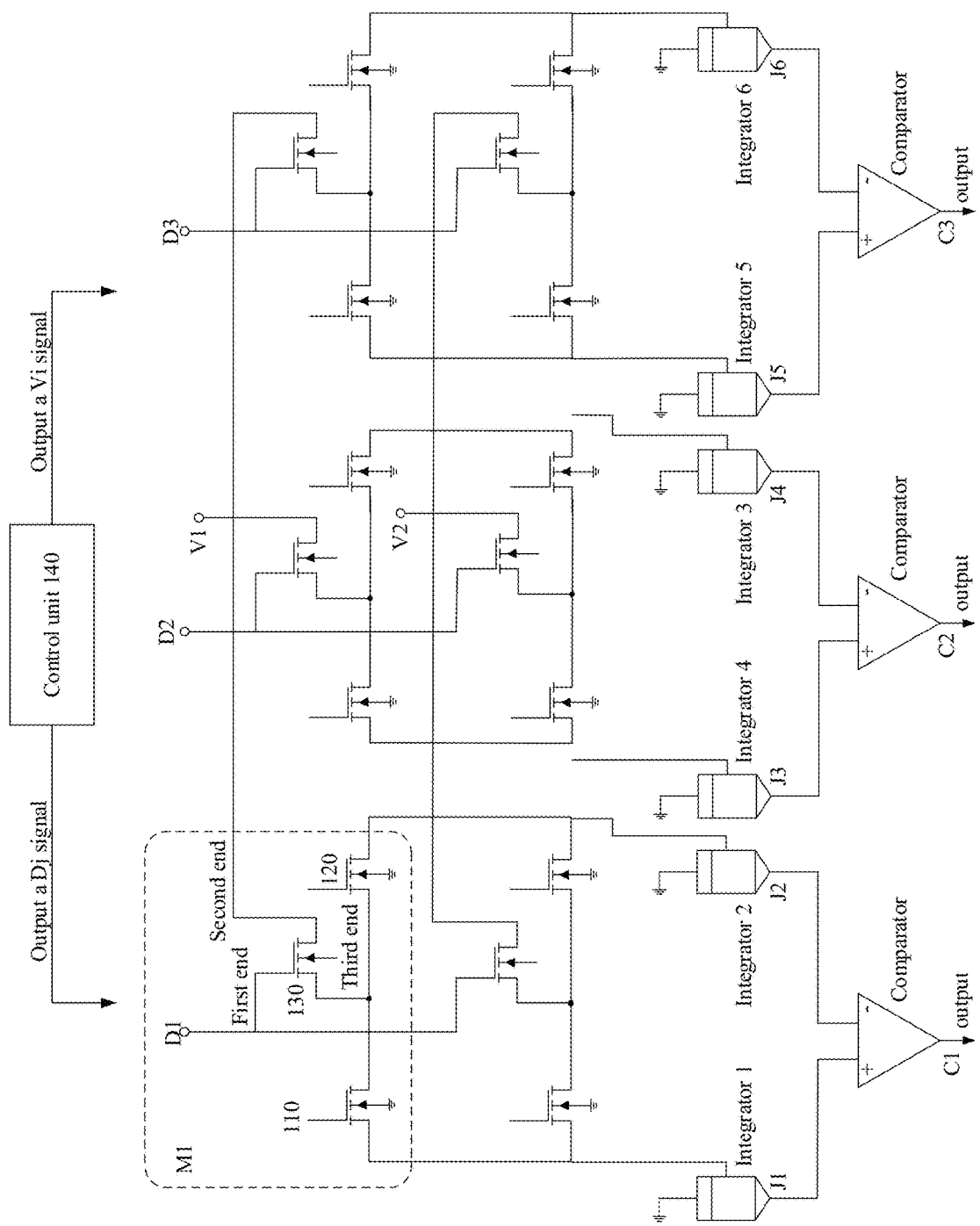
FIG. 5 is a schematic diagram of an array formed by PUF units of an embodiment of the present application.

That the PUF device includes a plurality of PUF units and a plurality of corresponding gating units is taken as an example below for description with reference to FIG. 5. Particularly, FIG. 5 shows a schematic diagram of a PUF device according to an embodiment of the present application. As shown in FIG. 5, it is assumed that the PUF device includes a PUF unit array of n*m and a corresponding gating unit array of n*m, where each gating unit is a third MOS transistor, n and m being positive integers, and at least one of n and m being not equal to 1, for example, n=2 and m=3 as shown in FIG. 5. In addition, the PUF device further includes at least one control unit, and the at least one control unit may be configured to control connection and disconnection of each gating unit. For example, that the PUF device includes a control unit is taken as an example for description in FIG. 5, and the control unit controls connection and disconnection of each gating unit by outputting different signals. The PUF further includes at least one processing unit. For example, the at least one processing unit may further include integrators such as integrators 1 to 6 in FIG. 5, and the at least one processing unit may further include comparators such as three comparators in FIG. 5.

As shown in FIG. 5, a unit structure M1 in the upper left corner is taken as an example. The M1 includes a first PUF unit and a corresponding first gating unit, where the first PUF unit includes two MOS transistors, that is, the left and the right MOS transistors in M1, a first MOS transistor 110 and a second MOS transistor 120, respectively, and the first PUF unit may use the foregoing first PUF unit 100; and the first gating unit is a MOS transistor in the middle of the M1, that is, a third MOS transistor 130. The structure of each unit in the PUF unit array of n*m shown in FIG. 5 is the same as that of the M1, and will not be repeated redundantly herein.

As shown in FIG. 5, for n third MOS transistors 130 in each of m columns, first ends of the n third MOS transistors are electrically connected with each other, where the first end may be gates, sources or drains of the third MOS transistors 130. For example, a first end in FIG. 5 is a gate of a MOS transistor, that is, gates of n third MOS transistors 130 in each column are connected together to form a Dj end, j=1, 2, . . . , m. That is, in FIG. 5, gates in the first column are connected to be a D1 end, gates in the second column are connected to be a D2 end, and so on.

Similarly, for m third MOS transistors 130 in each of n rows, second ends of the m third MOS transistors 130 are electrically connected, where the first ends and the second ends are different ends, and if the first ends are gates of the third MOS transistors 130, the second ends are sources or drains; or if the first ends are sources or drains of the third MOS transistors 130, and the second ends are gates. For example, a second end in FIG. 5 is a drain of a MOS transistor, that is, drains of m third MOS transistors 130 in each row are connected together to form a Vi end, i=1, 2, . . . , n. That is, in FIG. 5, drains in the first row are connected to be a V1 end, drains in the second row are connected to be a V2 end, and so on.

In addition, for a remaining end of each third transistor 130 other than a first end and a second end, for example, it may be referred to as a third end. A third end of a third MOS transistor included in the first unit M1 is taken as an example here for description. The third end is connected to the first MOS transistor 110 and the second MOS transistor 120 included in the first unit M1, respectively. Particularly, the third end of the third MOS transistor 130 is connected to a first source of the first MOS transistor 110 and a second source of the second MOS transistor 120 in the first unit M1, respectively, so as to input a same input voltage to the first source and the second source.

When the PUF device shown in FIG. 5 is in operation, corresponding PUF units may be controlled to output random values by n*m gating units included. Particularly, when the PUF device needs to output a random value corresponding to a PUF unit in the i-th row and the j-th column, a pulse voltage or current signal is applied to the Dj and Vi ends by a control unit 140. For example, the gating units are controlled by the control unit 140 included in the PUF device, the control unit 140 inputs a first voltage to the Dj end and inputs a second voltage to the Vi end, then a third MOS transistor 130 in the i-th row and the j-th column is connected, the corresponding PUF unit in the i-th row and the j-th column is gated, and the corresponding random value may be output. For example, the PUF unit in the i-th row and the j-th column is gated, two integrators connected with the PUF unit perform integration and amplification processing on output results of two MOS of the PUF unit, for example, the two integrators amplify output voltages to obtain different voltage values, the voltage values are then compared by a same comparator, and one bit of data is output, that is, the random value corresponding to the PUF unit. Therefore, by selecting gating units corresponding to different PUF units in different rows or in different columns, a plurality of random values may be output, and then a random sequence of the PUF device is obtained.

Optionally, each PUF unit in the PUF device is connected to two integrators for respectively performing integration and amplification processing on output results of two MOS transistors in the unit. As shown in FIG. 5, a first MOS transistor in each of PUF units in a same column may be connected to one integrating amplifier, for example, first MOS transistors in PUF units in the first column are connected to an integrator J1; and correspondingly, a second MOS transistor in each PUF unit in the same column is connected to another integrating amplifier, for example, second MOS transistors in the PUF units in the first column are connected to an integrator J2, that is, two integrating amplifiers are shared in each column. Moreover, the two integrating amplifiers are connected to a same comparator, for example, the integrator J1 and the integrator J2 connected to the PUF units in the first column are commonly connected to a comparator C1 such that the comparator correspondingly outputs a comparison result, that is, outputs corresponding data.

Optionally, first MOS transistors in PUF units in each row may be further connected to a same integrator, and then second MOS transistors in the PUF units in the row are connected to another integrator, that is, two integrating amplifiers are shared in each row. Moreover, the two integrating amplifiers are connected to a same comparator, and the comparator may also correspondingly output a comparison result, that is, output corresponding data.

For example, as shown in FIG. 5, that the PUF device needs to output a random value corresponding to a PUF unit in the first row and the second column is taken as an example, that is, i=1, j=2. The first voltage is output to a D2 end and the second voltage is output to a V1 end by the control unit, a third MOS transistor in the first row and the second column is connected, a corresponding PUF unit in the first row and the second column is gated, and corresponding integrators 3 and 4 may perform integration and amplification processing on output results of the left and right MOS transistors included in the PUF unit in the first row and the second column, for example, integration processing is performed on output voltages and then they are input to the intermediate comparator. The comparator outputs a random value corresponding to the PUF unit in the first row and the second column from an output end C2 by comparing the output results, for example, a random value 1 or 0 may be output.

Therefore, a PUF device according to an embodiment of the present application includes at least one PUF unit, each PUF unit needs only two MOS transistors, and thus the device has a simple structure and a relatively simple implementation manner, provides a possibility for an implementation of a large capacity PUF, and can be manufactured based on standard MOS processes in a manufacturing process without a need to add additional manufacturing processes. In use, gates of the two MOS transistors are floating, sources of the two MOS transistors are connected to a same input voltage, and the remaining two drains are applied with the same low potential such that the two MOS transistors present different turnon characteristics depending on the capacitance coupling effect, thereby implementing functions of the PUF. In the foregoing process, since no physical damage is caused to the device in a process of generating challenge/response pairs, it is relatively difficult to read the challenge/response pairs (CRPs) from the device itself to decipher a key it generates.

FIG. 6 shows a schematic flowchart of a method 500 of outputting a random sequence according to an embodiment of the present application, and the method 500 may be performed by the PUF device as shown in FIGS. 1 to 5. Particularly, as shown in FIG. 6, the method 500 is applied to a PUF device, the PUF device includes at least one PUF unit, a first PUF unit of the at least one PUF unit includes two MOS transistors, the two MOS transistors includes a first MOS transistor and a second MOS transistor, and the first PUF unit is any one of the at least one PUF unit.

The method 500 includes: S510, inputting a same input voltage to a first source of the first MOS transistor and a second source of the second MOS transistor of one of PUF units in the PUF device simultaneously, where a first gate of the first MOS transistor and a second gate of the second MOS transistor are floating; S520, acquiring a first result output by a first drain of the first MOS transistor and a second result output by a second drain of the second MOS transistor when an absolute value of the input voltage is greater than or equal to a preset voltage; and S530, outputting a first random value corresponding to the first PUF unit according to a difference between the first result and the second result.

Optionally, the two MOS transistors are MOS transistors having a same structure with only processing difference.

Optionally, the two MOS transistors share a same source.

Optionally, the method further includes: outputting a random sequence corresponding to the at least one PUF unit, where the random sequence includes at least one random value in one-to-one correspondence to the at least one PUF unit.

Optionally, the PUF device further includes at least one gating unit, and the method further includes: controlling, by a first gating unit of the at least one gating unit that corresponds to the first PUF unit, a state of the first PUF unit.

Optionally, the method further includes: controlling connection and disconnection of the first gating unit, where the first PUF unit is in a gating state when the first gating unit is connected, or the first PUF unit is in a disconnection state when the first gating unit is disconnected.

Optionally, the first gating unit is a third MOS transistor.

Optionally, the at least one PUF unit is a PUF unit array of n*m, the at least one gating unit is a third MOS transistor array of n*m, a third end of each third MOS transistor is electrically connected with two sources of two MOS transistors included in a corresponding PUF unit, first ends of n third MOS transistors in each column are electrically connected, and second ends of m third MOS transistors in each row are electrically connected, where a third MOS transistor in the i-th row and the j-th column is connected when a first end in the j-th column is input with a first voltage and a second end in the i-th row is input with a second voltage, n and m being positive integers, i=1, 2, . . . , n, and j=1, 2, . . . , m.

Optionally, the first end is a gate of the third MOS transistor, and the second end is a source or a drain of the third MOS transistor; or the first end is a source or a drain of the third MOS transistor, and the second end is a gate of the third MOS transistor.

Optionally, the PUF device includes a comparator, and the outputting the first random value corresponding to the first PUF unit according to the difference between the first result and the second result includes: comparing, by the comparator, the difference between the first result and the second result, and outputting the first random value.

Optionally, the at least one PUF unit is a PUF unit array of n*m, n and m being positive integers, and PUF units in a same row or in a same column are connected to a same comparator.

Optionally, the at least one PUF unit is a PUF unit array of n*m, n and m being positive integers, and each PUF unit in the PUF unit array includes the first MOS transistor and the second MOS; where drains of n first MOS transistors in PUF units in a same column are connected to a first integrator, drains of n second MOS transistors in the PUF units in the same column are connected to a second integrator, and the first integrator and the second integrator are connected to a same comparator; or drains of m first MOS transistors in PUF units in a same row are connected to a first integrator, drains of m second MOS transistors in the PUF units in the same row are connected to a second integrator, and the first integrator and the second integrator are connected to a same comparator.

Optionally, the comparing, by the comparator, the difference between the first result and the second result, and outputting the first random value includes: outputting, by the comparator, the first random value as a first numerical value if the first result is greater than the second result; or outputting, by the comparator, the first random value as a second numerical value if the first result is less than the second result.

Optionally, the PUF device further includes an integrator, the method further includes: performing, by the integrator, integration and amplification processing on the first result and the second result; and the comparing, by the comparator, the difference between the first result and the second result, and outputting the first random value includes: comparing, by the comparator, a difference between a first result and a second result after the integration and amplification processing, and outputting the first random value.

Therefore, a method of outputting a random sequence by a PUF device according to an embodiment of the present application is applied to the PUF device including at least one PUF unit, each PUF unit needs only two MOS transistors, and thus the device has a simple structure and a relatively simple implementation manner, provides a possibility for an implementation of a large capacity PUF, and can be manufactured based on standard MOS processes in a manufacturing process without a need to add additional manufacturing processes. In use, gates of the two MOS transistors are floating, sources of the two MOS transistors are connected to a same input voltage, and the remaining two drains are applied with the same low potential such that the two MOS transistors present different turnon characteristics depending on the capacitance coupling effect, thereby implementing functions of the PUF. In the foregoing process, since no physical damage is caused to the device in a process of generating challenge/response pairs, it is relatively difficult to read the challenge/response pairs (CRPs) from the device itself to decipher a key it generates.

It should be understood that, in various embodiments of the present application, values of sequence numbers of the foregoing various processes do not mean an order of execution which should be determined based upon functionalities and internal logics thereof, rather than setting any limitation to implementation of the embodiments of the present application.

Those of ordinary skill in the art may be aware that, units and algorithm steps of the examples described in the embodiments disclosed in this paper may be implemented by electronic hardware, computer software, or a combination of the two. Whether these functions are performed by hardware or software depends on specific applications and designed constraint conditions of the technical solutions. Those skilled may implement the described functions by using different methods for each specific application, but this implementation should not be considered to be beyond the scope of the present application.

Described above are the specific implementation manners of the present application only, but the protection scope of the present application is not limited thereto, those skilled who are familiar with the art could readily think of variations or substitutions within the technical scope disclosed by the present application, and these variations or substitutions shall fall within the protection scope of the present application. Therefore, the protection scope of the claims should prevail over the protection scope of the present application.

The invention claimed is:

1. A physical unclonable function (PUF) device, comprising:
    at least one processing unit; and
    at least one PUF unit, a first PUF unit of the at least one PUF unit comprising:
        a first MOS transistor comprising a first source, a first gate and a first drain; and
        a second MOS transistor comprising a second source, a second gate and a second drain,
            wherein the first source and the second source are connected to a same input voltage,
            the first gate and the second gate are floating, and
            the first drain and the second drain are connected with a first processing unit of the at least one processing unit, wherein the first processing unit is configured to:
            output a first random value corresponding to the first PUF unit according to a difference between a first result output by the first drain and a second result output by the second drain, when an absolute value of the input voltage is greater than or equal to a preset voltage.

2. The PUF device according to claim 1, wherein the first MOS transistor and the second MOS transistor are MOS transistors having a same structure with only processing difference.

3. The PUF device according to claim 1, wherein the first MOS transistor and the second MOS transistor share a same source.

4. The PUF device according to claim 1, wherein the at least one processing unit is configured to:
    output a random sequence corresponding to the at least one PUF unit, wherein the random sequence comprises at least one random value in one-to-one correspondence to the at least one PUF unit.

5. The PUF device according to claim 1, wherein the PUF device further comprises at least one gating unit, and
    a first gating unit of the at least one gating unit that corresponds to the first PUF unit is configured to control a state of the first PUF unit.

6. The PUF device according to claim 5, wherein the PUF device further comprises: at least one control unit, and
    a first control unit of the least one control unit is configured to control connection and disconnection of the corresponding first gating unit, wherein the first PUF unit is in a gating state when the first gating unit is connected, or the first PUF unit is in a disconnection state when the first gating unit is disconnected.

7. The PUF device according to claim 5, wherein the first gating unit is a third MOS transistor.

8. The PUF device according to claim 7, wherein the at least one PUF unit is a PUF unit array of n*m, the at least one gating unit is a third MOS transistor array of n*m,
    first ends of n third MOS transistors in each column are electrically connected, second ends of m third MOS transistors in each row are electrically connected, and a third end of each third MOS transistor is electrically connected with two sources of two MOS transistors comprised in a corresponding PUF unit, wherein a third MOS transistor in the i-th row and the j-th column is connected when a first end in the j-th column is input with a first voltage and a second end in the i-th row is input with a second voltage, n and m being positive integers, i=1, 2, . . . , n, and j=1, 2, . . . , m.

9. The PUF device according to claim 8, wherein the first end is a gate of the third MOS transistor, and the second end is a source or a drain of the third MOS transistor; or
    the first end is a source or a drain of the third MOS transistor, and the second end is a gate of the third MOS transistor.

10. The PUF device according to claim 1, wherein the first processing unit comprises a comparator, and
    the comparator is configured to: compare the difference between the first result and the second result, and output the first random value.

11. The PUF device according to claim 10, wherein the at least one PUF unit is a PUF unit array of n*m, n and m being positive integers, and PUF units in a same row or in a same column are connected to a same comparator.

12. The PUF device according to claim 11, wherein the comparator is configured to:
    output the first random value as a first numerical value when the first result is greater than the second result; or
    output the first random value as a second numerical value when the first result is less than the second result.

13. The PUF device according to claim 10, wherein the first processing unit further comprises an integrator, and the integrator is configured to: perform integration and amplification processing on the first result and the second result; and the comparator is configured to: compare a difference between a first result and a second result after the integration and amplification processing, and output the first random value.

14. The PUF device according to claim 13, wherein the at least one PUF unit is a PUF unit array of n*m, n and m being positive integers, and each PUF unit in the PUF unit array comprises the first MOS transistor and the second MOS transistor;

wherein drains of n first MOS transistors in PUF units in a same column are connected to a first integrator, drains of n second MOS transistors in the PUF units in the same column are connected to a second integrator, and the first integrator and the second integrator are connected to a same comparator; or drains of m first MOS transistors in PUF units in a same row are connected to a first integrator, drains of m second MOS transistors in the PUF units in the same row are connected to a second integrator, and the first integrator and the second integrator are connected to a same comparator.

15. A method of outputting a random sequence, wherein the method is applied to a physical unclonable function (PUF) device, the PUF device comprises at least one PUF unit, a first PUF unit of the at least one PUF unit comprises a first MOS transistor and a second MOS transistor, the first MOS transistor comprises a first source, a first gate and a first drain, the second MOS transistor comprises a second source, a second gate and a second drain, and the method comprises:

inputting a same input voltage to the first source and the second source simultaneously, wherein the first gate and the second gate are floating;

acquiring a first result output by the first drain and a second result output by the second drain when an absolute value of the input voltage is greater than or equal to a preset voltage; and outputting a first random value corresponding to the first PUF unit according to a difference between the first result and the second result.

16. The method according to claim 15, wherein the first MOS transistor and the second MOS transistor are MOS transistors having a same structure with only processing difference.

17. The method according to claim 16, wherein the first MOS transistor and the second MOS transistor share a same source.

18. The method according to claim 17, wherein the method further comprises:

outputting a random sequence corresponding to the at least one PUF unit, wherein the random sequence comprises at least one random value in one-to-one correspondence to the at least one PUF unit.

19. The method according to claim 18, wherein the PUF device further comprises at least one gating unit, and the method further comprises:

controlling, by a first gating unit of the at least one gating unit that corresponds to the first PUF unit, a state of the first PUF unit; and controlling connection and disconnection of the first gating unit, wherein the first PUF unit is in a gating state when the first gating unit is connected, or the first PUF unit is in a disconnection state when the first gating unit is disconnected.

20. A physical unclonable function (PUF) structure, comprising: a first MOS transistor and a second MOS transistor, wherein the first MOS transistor comprises a first source, a first gate and a first drain; and the second MOS transistor comprises a second source, a second gate and a second drain, wherein the first source and the second source are connected to a same input voltage;

the first gate and the second gate are floating; and the first drain outputs a first result and the second drain outputs a second result when an absolute value of the input voltage is greater than or equal to a preset voltage, and the first result and the second result are used to determine a random value of the PUF structure.

* * * * *